No. 648,253.  
J. K. GOODMAN.  
COMBINED LAND ROLLER, STALK CHOPPER, AND CLOD CRUSHER.  
(Application filed Dec. 12, 1899.)  
Patented Apr. 24, 1900.

(No Model.) 2 Sheets—Sheet 1.

WITNESSES:

INVENTOR  
John K. Goodman.  
BY  
ATTORNEYS

No. 648,253. Patented Apr. 24, 1900.
J. K. GOODMAN.
COMBINED LAND ROLLER, STALK CHOPPER, AND CLOD CRUSHER.
(Application filed Dec. 12, 1899.)

(No Model.) 2 Sheets—Sheet 2.

WITNESSES:
Jos. A. Ryan
Amos W Hart

INVENTOR
John K. Goodman,
BY Munn & Co.
ATTORNEYS

UNITED STATES PATENT OFFICE.

JOHN KNOX GOODMAN, OF MOUNT ULLA, NORTH CAROLINA.

COMBINED LAND-ROLLER, STALK-CHOPPER, AND CLOD-CRUSHER.

SPECIFICATION forming part of Letters Patent No. 648,253, dated April 24, 1900.

Application filed December 12, 1899. Serial No. 740,043. (No model.)

*To all whom it may concern:*

Be it known that I, JOHN KNOX GOODMAN, residing at Mount Ulla, in the county of Rowan and State of North Carolina, have made certain new and useful Improvements in a Combined Land-Roller, Stalk-Chopper, and Clod-Crusher, of which the following is a specification.

It is the object of my invention to provide an improved agricultural machine for preparing a field for a crop. It is particularly adapted for cutting corn and cotton stalks and dry weeds, either in rows or broadcast, by passing over them and pressing them down; also, for breaking and pulverizing clods and rolling land.

Figure 1:
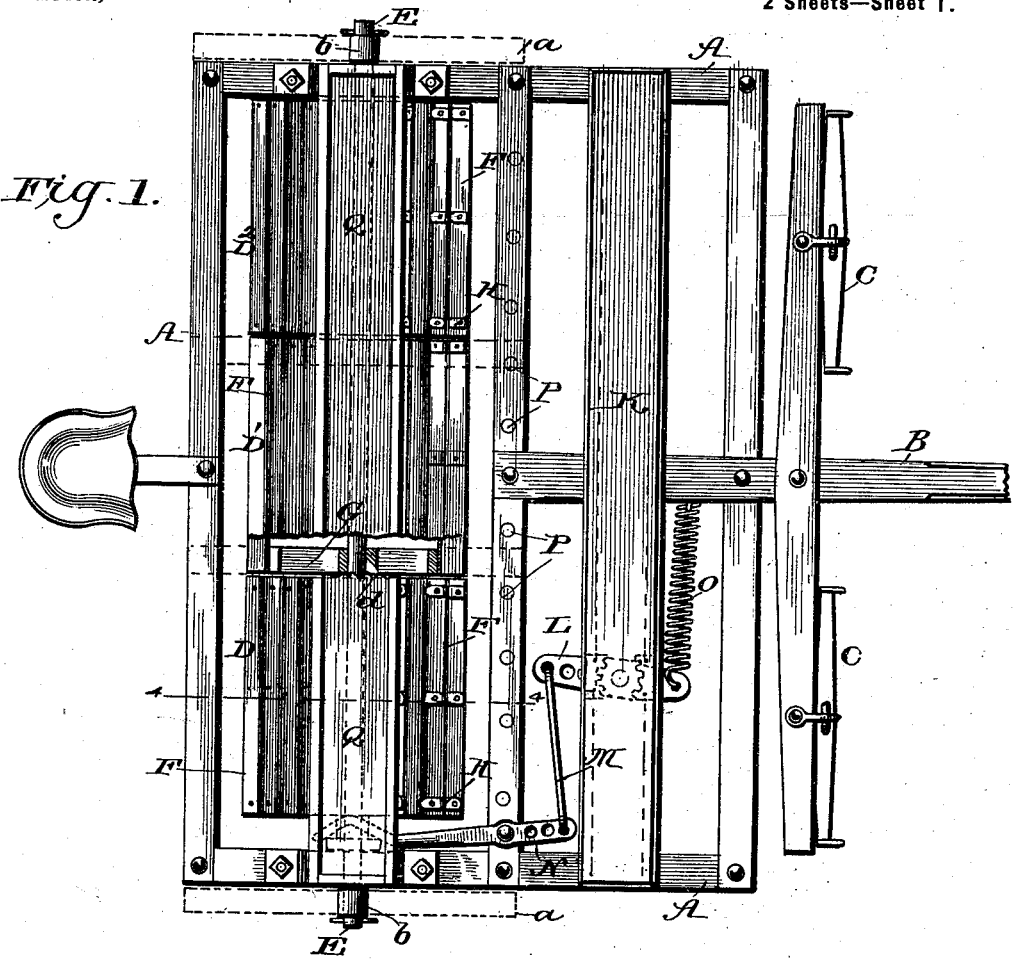
Figure 2:
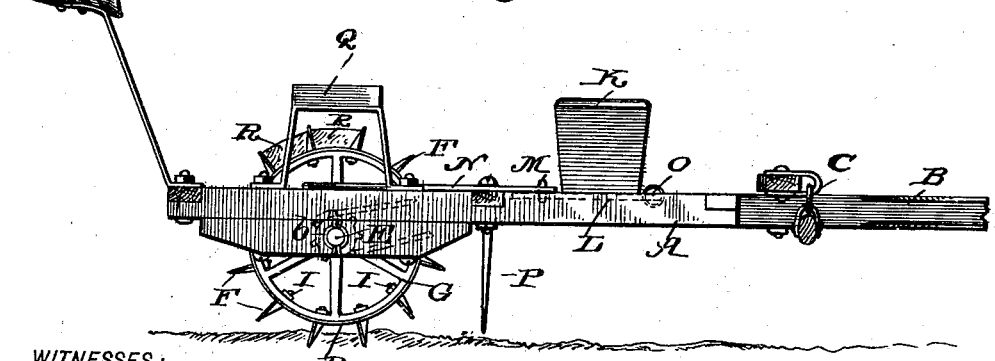
Figure 3:
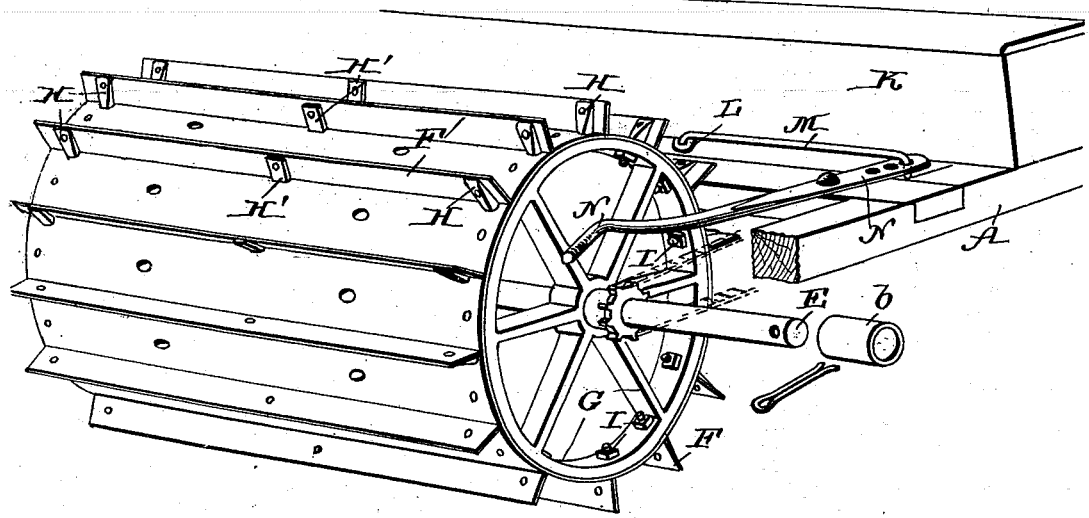
Figure 4:
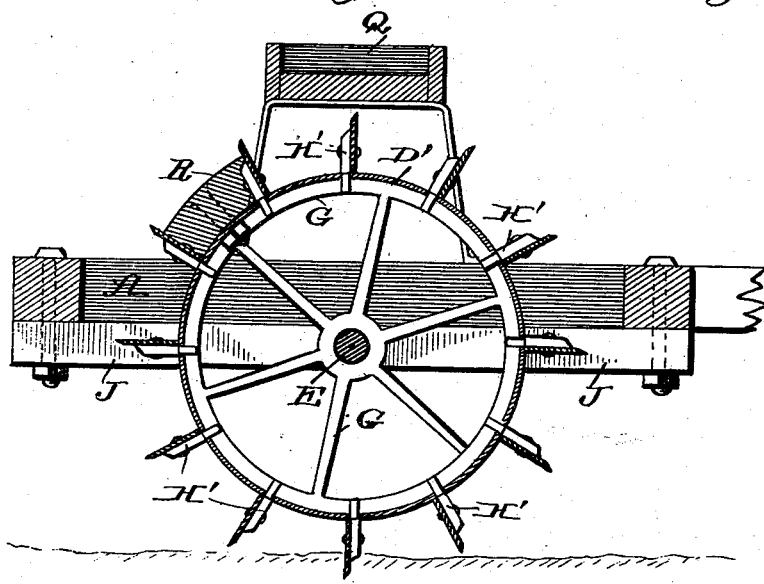
Figure 5:
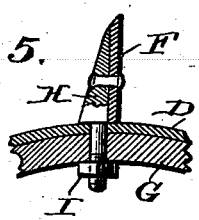

The construction and operation of the machine are as follows:

In the accompanying drawings, Figure 1 is a plan view, and Fig. 2 is a side view, of the machine. Fig. 3 is a perspective view, of a portion of the machine. Fig. 4 is a vertical transverse section on line 4 4 of Fig. 1. Fig. 5 is a detail section showing the attachment of a knife to a drum or roller.

As shown best in Fig. 1, the wooden frame A of the machine is rectangular and provided with a rigid pole or tongue B and draft appliances C. The three alined drums D, D', and $D^2$ are shown mounted on a transverse axle E and provided with knives or cutters F, shown arranged lengthwise on their peripheries. They may, however, be arranged diagonally or spirally. They are each constructed of a cylindrical sheet-metal body and circular spiders or frames G, secured therein, (see Figs. 3 and 4,) the same being formed of a hub, radial spokes, and a circular rim. The arrangement is such that strength and lightness are combined and provision made for weighting when heavy work is required.

Three drums D, D', and $D^2$ are shown; but any other number may be used. They are mounted free or rotatably on the axle E, so that the machine may be readily turned to the right or left, around corners, &c.

As represented by dotted lines in Fig. 1, wheels *a* are in practice applied to the ends of the axle E for transporting the machine to and from the field or elsewhere. When the wheels are removed, the place of their hubs is occupied by cylindrical washers *b*, Fig. 3, which hold the axle in due position endwise. Spring-keys inserted in the ends of the axle hold it in the machine.

The knives F are made of sheet-steel and riveted to the elongated wedge-shaped heads of bolts H, Fig. 5, whose cylindrical portions pass through the end spiders G and are screw-threaded to receive nuts I. These bolts H are employed only at the ends of the drums, where the nuts I are accessible, and the central portions of the knives F are supported by shouldered studs H', having reduced smooth or threadless shanks that fit closely in holes in the drums. It is apparent this arrangement of bolts and studs secures and braces the knives and at the same time adapts them to be easily attached or removed for sharpening, &c., also for producing a plain roller—that is to say, the knives are set in place by inserting the threaded and smooth shanks of the respective bolts and studs in the end holes and intermediate holes of the drum, and nuts are then applied to the bolts H, whereby the knives and studs are held in place, and the latter duly support the knives and yet allow their instant detachment when the nuts are removed.

The middle roller D' may be detached when it is desired to use the machine thus for double-row cutting. The single drum thus removed may be used in a suitable small frame for stalk-cutting on stumpy ground. Two bars J are then arranged transversely beneath the frame A, as shown in full lines, Fig. 4, and by dotted lines, Fig. 1, and secured by the same vertical bolts that hold the weight-box 2 in place. These bars J have transverse holes at the middle of their length to receive the axle E, so that bars support the latter in its middle portion. In other words, the bars furnish supplemental bearings for the axle, and special boxes or bushings for the holes therein are not required. In fact, the wood bearing is preferable in this class of machines.

When the three drums are used, their rims come together as they revolve on occasion of a severe jolt, and the drums prevent the axle bending at such time.

The sprocket shown in full lines, Fig. 3, and dotted lines, Figs. 1 and 2, may be used for operating, by means of a chain, the discharge mechanism of a seeder or guano-distributer, which may be employed, if desired, but which I do not here claim. It also serves to fill the space between the adjacent drums D and frame A, so as to hold all the drums in proper position on the axle.

A seedbox K is placed in front of the drums and provided with a suitable discharge mechanism. I prefer for this purpose to use the well-known arrangement of cords extending and adapted to reciprocate beneath the seed-holes in the bottom of the box K and to reciprocate the parallel bars (not shown) to which such cords are ordinarily attached by means of a lever L, having a toothed plate attached for engaging correspondingly-toothed plates on said bars. This lever L is connected by a rod M with a lever N, which is pivoted on the frame A and extends rearward, its rear end being bent at an obtuse angle to adapt it for sliding engagement with the spokes of the drum-spiders G, as shown in Fig. 3. A spring O serves to retract the lever-and-cord mechanism. It is apparent the lever N will be vibrated each time a spoke contacts with its bent end. Holes are provided in the two levers L and N to provide for adjustment of the stroke, and thereby regulate the discharge of seed. The connecting-rod M is bent downward at each end and may hence be readily attached or removed to throw the seeding attachment into or out of action. A series of tines P is arranged in rear of the seedbox K. These tines do not reach quite to the ground. Their function is to comb or direct or straighten out the stalks, so that they will be duly acted on by the drum cutters or knives F. Said tines can be readily removed and laid aside when not required for use. A weight-holding box Q is arranged over the drums, and the driver's seat is located in rear of it; but said seat may be attached to the weight-box, if preferred.

In place of the seedbox K a guano-box and discharge mechanism may be substituted and the latter operated by the same means as used with the seedbox.

To regulate the depth of cut of the knives F, I apply and fit wooden blocks R between the knives F, as indicated in Figs. 2 and 4. These blocks may be secured by screws passing through them and entering the drums or by screw-bolts provided with nuts applied on the inner side of the drum.

It is obvious that by making the blocks R of due thickness the drums may be used as plain rollers.

What I claim is—

The combination, with the drum or hollow cylinder and circular frames or spiders fitted in its ends, said drum and frames having coincident radial holes and the drum being also provided with holes intermediate of its ends, of a series of longitudinal detachable knives each having at the ends shouldered bolts H provided with threaded shanks, and at its middle a shouldered stud H' having smooth shanks, and nuts which are applied to the bolts, the studs being left free, whereby the knives are held in place, and the studs support the middle portions of the knives, while being adapted for instant detachment along with the knives when the bolt-nuts are removed, as shown and described.

JOHN KNOX GOODMAN.

Witnesses:
J. M. MONROE,
J. FRANK McCUBBINS.